United States Patent Office 3,011,497
Patented Dec. 5, 1961

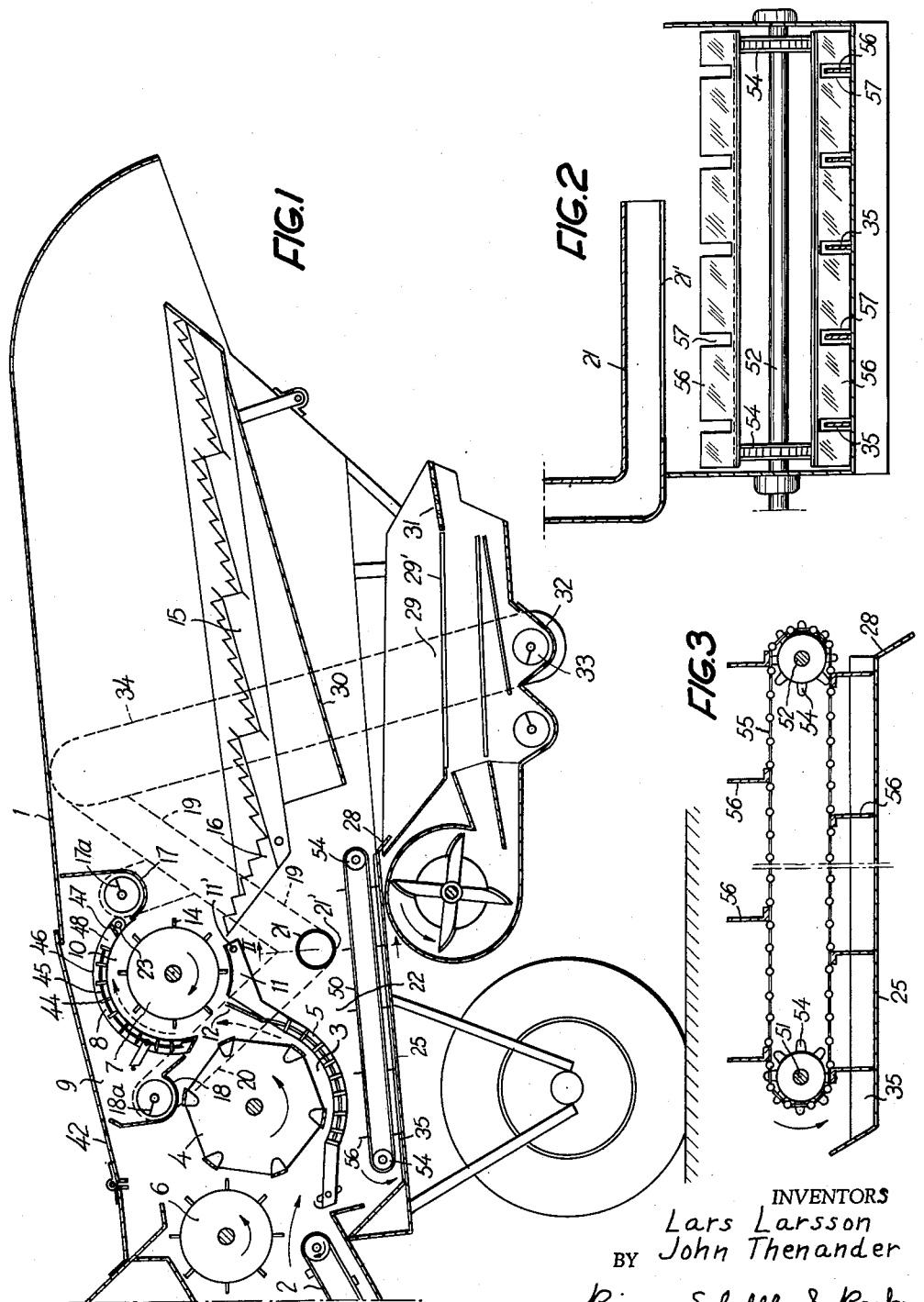

3,011,497
THRESHING MACHINE, ESPECIALLY
COMBINE HARVESTER
Lars Larsson and John Thenander, Morgongava, Sweden, assignors to Aktiebolaget Westerasmaskiner, Morgongava, Sweden, a corporation of Sweden
Filed Nov. 17, 1958, Ser. No. 774,376
Claims priority, application Sweden Nov. 21, 1957
3 Claims. (Cl. 130—27)

This invention relates to a threshing machine and especially a combine harvester comprising a beater located between the threshing cylinder and a straw rack, which beater is adapted to convey the threshed material from the threshing cylinder to the straw rack. The invention is substantially characterized in that the beater is arranged to rotate in a direction opposite to the direction of rotation of the threshing cylinder whereby to convey the threshed material over the upper side of the beater, and in that above the beater there is provided an arcuate sieve for guiding the threshed material, through which sieve grain contained in said material can pass upwards.

Preferably, the path of entrance to the clearance between the beater and the sieve extends substantially vertically above the rear side of the threshing cylinder. Further, the forward part of the sieve located above the beater is preferably directed downwardly or obliquely downwardly, for instance, in a manner such as to be tangent or substantially tangent to the rear side of the concave.

In combine harvesters it is suitable and usual, for constructural reasons and in view of the operating conditions, that the material to be threshed is fed substantially horizontally into the clearance between the threshing cylinder and the concave. Further, it is suitable and usual to have the straw rack located substantially right behind the threshing cylinder. Since the concave must have a certain predetermined length, the rear part of the concave has to be directed obliquely upwardly. Consequently, the material leaving the clearance between the cylinder and the concave will move upwardly or obliquely backwardly and upwardly. In conventional threshing machines, the beater located between the cylinder and the straw rack rotates in the same direction as the cylinder. The beater consequently tends to resist the current of the material arriving from the threshing elements and deflects the upwardly directed current downwards and backwards toward the straw rack. As a result, the material will take a double-curved path with abrupt changes in direction. In an arrangement according to the invention, however, the beater moves the material arriving from the threshing elements in the same direction upwards or obliquely upwards without substantial change in direction and then along a single curve rearwardly to the straw rack. Due to the fact that the sieve is located above the beater and the rear part of the beater advantageously is directed obliquely downwardly, the sieve can be very long, resulting in a more effective separation of grain from the straw.

The invention is described more closely hereinbelow with reference to an embodiment illustrated in the annexed drawing. FIG. 1 is a diagrammatic longitudinal section of a combine harvester constructed in accordance with the invention, the appertaining cutting apparatus being not shown. FIG. 2 is a sectional view on the line II—II of FIG. 1, and FIG. 3 is a lateral view of FIG. 2.

Referring to the drawing, numeral 1 denotes the casing of the threshing machine, and numeral 2 denotes an elevator which conveys the cut material into the clearance 3 between the threshing cylinder 4 and the concave 5. Numeral 6 denotes a feeder cylinder for the material to be threshed. The rear part of the concave is directed upwardly and rearwardly at a steep angle. Rearwardly of the cylinder 4 and at a higher level than the cylinder there is provided a beater 7 the vanes of which are indicated at 14. As shown by the arrows, the beater rotates in a direction opposite to the direction of rotation of the threshing cylinder such that the sides of the cylinder and beater facing each other move in the same direction. Consequently, the threshed material will be moved upwards to the upper side of the beater. Above the beater there is provided a substantially arcuate sieve 8 through which grain contained in the threshed material is thrown upwardly into a space 9 separate from the interior of the threshing machine.

The radial extension of the clearance 10 between the beater and the sieve 8 is considerably greater than the radial extension of the clearance 3 between the cylinder and the concave 5, for instance, at least twice as great. When the threshing cylinder is rotating at its maximum speed, it has about the same peripheral velocity as the beater. At low speeds of the cylinder, the peripheral velocity of the beater is lower than that of the cylinder.

The forward end of the sieve 8 or a forward elongation thereof is directed substantially tangentially to the rear side of the cylinder 4 such that the entrance to the clearance 10 is located right above or almost right above the rear side of the cylinder. The straw which to some extent tends to follow the movement of the cylinder even after having left the clearance 3 is moved substantially vertically upwards into the clearance 10 and is guided therein along a smooth curve upwards and backwards without abrupt changes in direction. The angular length of the sieve 8 is greater than 90° and, in the embodiment exemplified, is between 120° and 150°. The angular length may even amount to about 180° or more if the sieve has elongated guide members. The discharge end of the clearance 10 is directed obliquely backwards and downwards such as to deliver the straw at a proper angle to the straw rack 15.

The sieve 8 as well as the concave 5 may consist of transverse bars 44 and longitudinal wires 45 or exclusively of wires in a frame 46 which is pivotally mounted on a transverse shaft 23. The network 44, 45 of the sieve ends at some distance ahead of a transverse bar 47 in the frame 46, there being left a free aperture 48 ahead of the bar 47.

The concave 5 has a rear elongated part 11 by means of which it is pivotally mounted in the machine on a shaft 11'. The rear part of the concave merges into parallel spaced wires or bars 12 which are directed substantially towards the shaft of the beater. The upper end of the elongated part 11 is arcuate and located close to the vanes 14 of the beater.

The forward part 16 of the straw rack makes an angle with the main plane of the rack and is directed obliquely upwardly and forwardly towards the beater. The part 16 extends close to the beater, in order to prevent straw from winding itself around the beater. The part 16 is substantially parallel to a tangent to the rear end of the sieve 8.

In the space 9 above the beater there are provided collecting channels 17 and 18 for the grain etc. passing through the sieve. One of the channels is located ahead of the beater and the other one rearwardly of the beater. The channels extend throughout the width of the threshing machine and communicate with ducts 19 and 20, respectively, which are located at the outside of the machine and through which the material passes down to a lower transverse duct or channel 21 located in a space 22 below the concave 5 and the beater. The channels 17 and 18 have conveyor screws 17a and 18a, respectively. A similar conveyor screw may be provided in the channel or duct 21. The space 9 is accessible from above through a door 42. From the channel 21 the grain, chaff etc. drop to the floor 25 of the space 22. Also grain etc.

passing through the concave 5 drops to the floor 25. In order to have the material well distributed in the transverse direction of the threshing machine, the duct or channel 21 should extend over more than half the width of the threshing machine. The duct may be open at its free end and has a longitudinal slot 21' through which the material gradually drops down.

The floor 25 is rigidly secured to the frame of the machine and is substantially horizontal. From the floor, the material is moved by means of a scraper conveyor 50 (see also FIGS. 2 and 3) over the rear edge 28 of the floor to the cleaner 29 which may be of conventional type. The material dropping through the straw rack 15 passes to the cleaner via an inclined sieve 30. Heavy material which cannot pass through the upper riddle 29' moves through a screen 31 into a transverse channel 32 at the bottom of the cleaner. The channel 32 has a conveyor screw 33 which moves the material to an elevator 34 of conventional type. From this elevator the material passes through the duct 19 into the distributor channel 21.

Secured to the floor 25 are parallel guide ribs 35 which divide the space above the floor 25 into a plurality of longitudinal passages. The ribs 35 prevent the material on the floor from being moved towards one side of the combine harvester when the harvester is moving on a sloping ground. The material will thus always be supplied to the cleaner in the form of a layer as uniform as possible, thereby ensuring an efficient operation of the cleaner.

The scraper conveyor is shown in FIGS. 2 and 3 to an enlarged scale. Mounted in the walls of the harvester are two shafts 51 and 52 one of which is suitably driven. Near the ends of the shafts are mounted sprocket-wheels 54 for endless chains 55. The chains have transversely extending scraper plates 56 the outer edges of which engage the floor 25. The plates 56 have recesses 57 for the guide ribs 35 secured to the floor 25.

What we claim is:

1. In combination with a threshing machine for a combine harvester having a frame, a rotary threshing cylinder mounted in said frame, a straw rack mounted in said frame, and a rotary beater positioned intermediate the cylinder and the straw rack for conveying threshed material from said cylinder to said straw rack; an arcuate guide sieve positioned above said beater, the forward part of said guide sieve being directed substantially downwardly toward said threshing cylinder and the rear part of said sieve being directed obliquely rearwardly and downwardly toward said straw rack, said beater having a direction of rotation opposite to the direction of rotation of said threshing cylinder to convey the threshed material over the upper side of the beater to said straw rack and to project the grain in the material upwardly through said sieve, the forward extremity of said straw rack being angularly inclined relative to the main plane of the straw rack and extending obliquely upwardly and forwardly toward the beater and terminating adjacent the beater.

2. Apparatus as defined in claim 1 wherein the angularly inclined forward extremity of said straw rack is generally parallel to the plane tangent to the rear portion of said guide sieve.

3. Apparatus as defined in claim 1 wherein said sieve is pivotally connected at its rear end to said threshing machine frame and said frame includes a top wall containing an access door above said guide sieve.

References Cited in the file of this patent

UNITED STATES PATENTS

| | | |
|---|---|---|
| 1,110,768 | George | Sept. 15, 1914 |
| 1,136,973 | Peters | Apr. 27, 1915 |
| 2,003,523 | Thoen | June 4, 1935 |
| 2,542,346 | Mormann | Feb. 20, 1951 |

FOREIGN PATENTS

| | | |
|---|---|---|
| 661,234 | France | Mar. 4, 1929 |
| 805,575 | France | Aug. 31, 1936 |
| 219,065 | Switzerland | May 16, 1942 |